No. 677,991. Patented July 9, 1901.
E. A. JAVAL.
ACETYLENE GAS GENERATOR.
(Application filed Apr. 18, 1900.)

(No Model.)

WITNESSES:

INVENTOR:
Eugène Alfred Javal,
By Attorneys,

UNITED STATES PATENT OFFICE.

EUGÈNE ALFRED JAVAL, OF NEUILLY, FRANCE.

ACETYLENE-GAS GENERATOR.

SPECIFICATION forming part of Letters Patent No. 677,991, dated July 9, 1901.

Application filed April 18, 1900. Serial No. 13,307. (No model.)

*To all whom it may concern:*

Be it known that I, EUGÈNE ALFRED JAVAL, a citizen of the French Republic, residing in Neuilly-sur-Seine, (Seine,) France, have invented certain new and useful Improvements in Apparatus for Generating Acetylene Gas, of which the following is a specification.

This invention relates to acetylene-gas generators, and has for its object to provide an improved device whereby at each admission of a fresh charge of calcium carbid the admission of a suitable quantity of water takes place, while at the same time is effected the automatic discharge of the residuary products at the lower portion of the apparatus.

My improved acetylene-generator is adapted to operate with various methods of carbid-supply and may be employed with a gasometer of any kind.

In the accompanying drawings I have shown my improved generator by way of example as adapted for one method of admission of the carbid.

Figure 1:
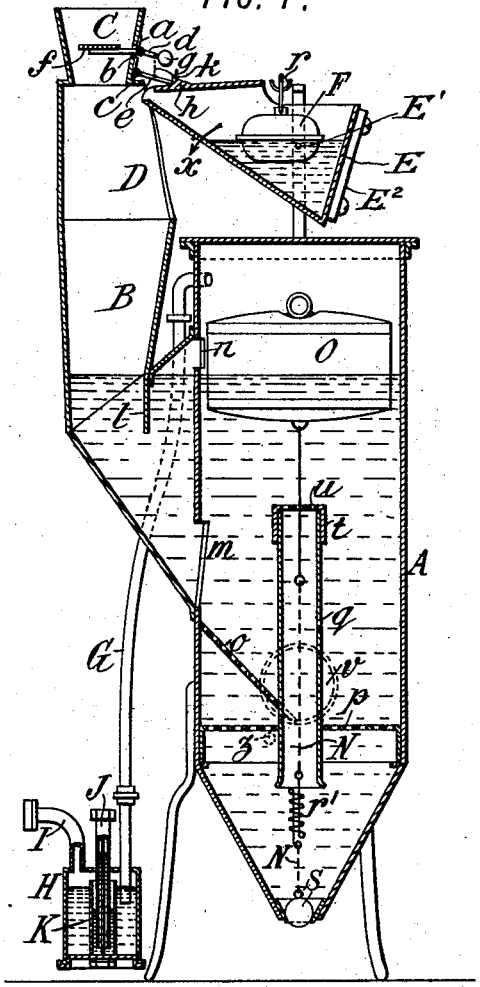
Figure 2:
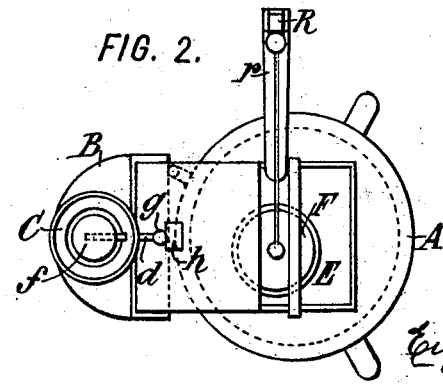

In the drawings, Figure 1 is a general sectional view of the generator adapted for being supplied with carbid in accordance with the method illustrated. Fig. 2 is a plan view of the same.

The gas-generator consists of a cylinder A, beside which is arranged a chute B, serving at the same time for supplying both the carbid and the water. This chute terminates at its upper portion in a hopper or funnel C, into which the carbid is admitted in small successive fractions, an advantageous method of effecting the admission of the carbid being by means of the automatic bucket distributer described in the specification forming part of my Letters Patent No. 647,496, dated April 17, 1900.

The chute B is provided at its side D with a large aperture, into which penetrates a tank E, oscillating on a pivot E' and containing the charge of water which is to be supplied to the apparatus at each feed. This tank is supplied with water by any suitable means, preferably by means of a cock R, connected with a float F, which conducts the water to a channel r, terminating above the said tank E.

The connection between the water-supply tank E and the carbid-admission hopper may be established in the following manner, for example: To the side of the hopper C is rigidly fixed a support a, carrying the axes b and c of two levers d and e. The lever d, which enters the hopper C, supports a small plate or disk f, against which the calcium carbid strikes when it falls within the hopper, this lever d being continued outside the hopper and provided with a counterweight g. The other lever e bears against a stop h, which is provided upon the water-tank E. The two levers d and e are connected by means of a chain k or the like. The carbid in falling into the hopper C strikes against the plate f and causes the lever d to oscillate. This lever d acts upon the chain k and raises the lever e, which was previously bearing against the stop h. The oscillating tank E, which is filled with water, being no longer maintained oscillates in the direction indicated by the arrow x and rapidly empties its supply of water upon the carbid which has just fallen into the supply-chute B. This water carries the carbid into the generator without the possibility of any liberation of gas taking place in the upper portion of the supply-chute. When the tank has emptied itself, it returns to its normal position (its rear end being weighted, if necessary, for this purpose, as by the attachment of a weight $E^2$) and is again filled. The construction and operation of such tanks are well known, and I need not therefore describe the same in more detail. In the lower portion of the chute is arranged a small partition $l$ or the like, serving to prevent the escape of gas to the outside in case a small quantity of gas, following the inner wall of the generator or arising from the ebullition which takes place when the carbid enters the cylinder, should enter the chute through the aperture m. By means of the partition $l$ this gas would be conducted toward the generator and would reënter this latter through the aperture n.

In the lower portion of the chute B is provided an inclined grating o, which extends as far as the grating p, which receives the carbid. At the center of this grating p is arranged a tube q, which serves to hold a spherical valve S, and at the same time prevents particles of carbon from reaching this valve. This tube q is provided at its upper portion with a cap t, the top of which is provided with a suitable grid or grating $u$. The inclined grating $o$, by projecting the carbid as far as possible from the supply-chute B, removes to as great distance as possible the ebullition which takes place at the commencement of the attack on the carbid. Above the grating $p$ is arranged a cleansing and inspection plug $v$. When it is desired to remove this plug, the greater portion of the water is first of all run off through a suitable cock $z$ or the like.

The bottom of the generator is preferably of conical shape, and in this conical portion the waste lime collects. The lower orifice of this cone forms a metal seat, upon which rests a spherical valve of rubber-covered metal S. This valve is connected by means of a chain N with a float O by the intermediary of a spiral spring $r'$, the extremities of which are inversely attached to the two ends of said chain N. It follows from this arrangement that when an admission of water into the generator takes place the first effect is a lifting movement of the float O, which by the intermediary of the upper portion of the chain N results in bringing the extremities of the spring $r'$ together, so that this latter becomes compressed. When the effort caused by this compression of the spring attains a certain limit, the valve starts from its seat and there is a sudden expansion of the spring, and consequently a sudden lifting of the valve S from its seat. There is consequently immediately formed around this valve S a very large annular space through which the water charged with lime flows copiously, carrying with it the whole of the deposit which has accumulated at the bottom of the generator. An automatic discharge of the residue is thus produced at the same time as the fresh carbid and the pure water are admitted.

The gas produced in the generator escapes through the pipe G and enters the purifying-intercepter H, which has the usual overflow-pipe J, surrounded by a tube K. This or some similar appliance is in common use in acetylene-generating plants, and further description thereof is unnecessary, as I am not claiming the same as part of my present invention.

I claim—

1. An acetylene-generating apparatus comprising, in combination, a generator, means for admitting successive charges of carbid, a tank for containing a measured quantity of water, a movable member operated by the introduction of a charge of carbid, a connection between said movable member and said water-tank whereby the introduction of a charge of carbid tips said tank to empty the same into said generator, a grill in said generator on which the carbid rests during generation of the gas, a conical bottom in said generator below said grill into which the residue falls, a valve closing said conical bottom, a float in said generator, a connection between said float and said valve and a compression-spring interposed in said connection whereby the introduction of water into said generator lifts said float first to compress said spring, then to suddenly open said valve a considerable distance, so as to rapidly eject the residue in the conical bottom.

2. An acetylene-generator comprising in combination, a generator, means for admitting successive charges of carbid, a tank for containing a measured quantity of water, a movable member operated by the introduction of a charge of carbid, and a connection between said movable member and said water-tank whereby the introduction of a charge of carbid tips said tank to empty the same into said generator.

3. The combination in an acetylene-generator, of a grill in said generator on which the carbid rests during generation of the gas, said generator having a conical bottom below said grill into which the residue falls, a valve closing said conical bottom, a float in said generator, a connection between said float and said valve, and a compression-spring interposed in said connection whereby the introduction of water into said generator lifts said float first to compress said spring, then to suddenly open said valve a considerable distance, so as to rapidly eject the residue in the conical bottom.

4. An acetylene-generating apparatus comprising, in combination, a generator, means for admitting successive charges of carbid, a tank for containing a measured quantity of water, means operated by the introduction of a charge of carbid for emptying said tank into said generator, a valve closing the bottom of the generator, and means operated by the introduction of said charge of carbid and water for automatically opening said valve to eject the residue.

In witness whereof I have hereunto signed my name in the presence of two subscribing witnesses.

EUGÈNE ALFRED JAVAL.

Witnesses:
J. ALLISON BOWEN,
CHARLES MARDELET.